(12) United States Patent
Abedin et al.

(10) Patent No.: US 11,120,181 B1
(45) Date of Patent: Sep. 14, 2021

(54) STRUCTURAL JOINT DAMAGE DETECTOR TOOL

(71) Applicants: Mohammad Abedin, Miami, FL (US); Armin Mehrabi, Miami, FL (US)

(72) Inventors: Mohammad Abedin, Miami, FL (US); Armin Mehrabi, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/213,663

(22) Filed: Mar. 26, 2021

(51) Int. Cl.
| | |
|---|---|
| *G06F 30/23* | (2020.01) |
| *G06F 30/13* | (2020.01) |
| *G06T 17/20* | (2006.01) |
| *G06F 119/02* | (2020.01) |

(52) U.S. Cl.
CPC .............. *G06F 30/23* (2020.01); *G06F 30/13* (2020.01); *G06T 17/20* (2013.01); *G06F 2119/02* (2020.01)

(58) Field of Classification Search
CPC ....................................................... G06F 30/23
USPC .............................................................. 703/6
See application file for complete search history.

(56) References Cited

U.S. PATENT DOCUMENTS

2019/0017911 A1* 1/2019 Kiranyaz ................. G01N 3/02

* cited by examiner

*Primary Examiner* — Eric D Lee
(74) *Attorney, Agent, or Firm* — Saliwanchik, Lloyd & Eisenschenk

(57) ABSTRACT

Systems and methods are provided to detect and determine the location and relative significance of joint damage in structures including bridges, and particularly including accelerated bridge construction (ABC) bridges, based on measured changes in bridge dynamic or static response parameters and model updating methods. These systems and methods may use a detailed finite element model to calculate the sensitivity of joint damages in the structure response parameters for a particular loading configuration and the change of state in the structure obtained through instrumentation and response monitoring of the structure compared to a prior condition of the structure in order to identify potential damages.

20 Claims, 10 Drawing Sheets

FIG. 10

STRUCTURAL JOINT DAMAGE DETECTOR TOOL

BACKGROUND

Bridges are ubiquitous features of the American transportation system, connecting the roadways that link the infrastructure of the United States. Currently, there are over 600,000 bridges in the U.S.; however, of these, more than one-third (37% according to the latest report from the American Road and Transportation Builders Association) need repair. Estimates of the costs of improving these structures to an acceptable standard exceed $3.5 trillion in expenditures by the end of 2020. As these figures indicate, the U.S. struggles with significant deficiencies in its most essential infrastructure. However, repairs and replacement are not the only costs associated with bridges, as monitoring alone requires a significant investment by local, regional, and national authorities as well as causes significant traffic blockages and hazards for both those assessing the damage and the drivers negotiating the roads. There is an urgent need for new ways to advance the United States' response to its current and impending bridge crisis as the structures continue to age. This includes tools both to predict and monitor needed bridge maintenance, which ultimately reduces high financial costs while increasing public safety.

BRIEF SUMMARY

Embodiments of the subject invention provide systems and methods useful to detect and determine the location and relative significance of joint damage in structures including but not limited to bridges, and particularly including accelerated bridge construction (ABC) bridges, based on measured changes in structural dynamic or static response parameters and model updating methods. In certain embodiments these systems and methods may use a detailed finite element model to calculate the sensitivity of joint damages in the structure response parameters for a particular loading configuration and the change of state in the structure obtained through instrumentation and response monitoring of the structure compared to a prior condition of the structure in order to identify potential damages.

The use of accelerated bridge construction (ABC), in which prefabricated concrete components are used on-site in the construction of the bridges to minimize on-site construction time, is becoming more widespread for building new or replacing existing bridges. Prefabrication eliminates the time of concrete deck casting and curing at the bridge site and leaves just a minimal amount of cast-in-place concrete work for securing panel connections at the site. Utilizing the precast system makes the process of constructing easier and faster.

Despite the recognized life-cycle performance and cost benefits of ABC bridges, joints have been problematic, and some worry about the degrading environmental and mechanical effects on ABC joints. Such deterioration affects the bridge integrity, alters the live-load distribution, and can potentially reduce the load-carrying capacity of the structure, which can pose a safety problem over time.

In an embodiment, a system for identifying the location and severity of possible damages in structural joints of a structure by determining best fit values for a structure joint damage vector in the structure can comprise: a processor; and a machine-readable medium in operable communication with the processor and having instructions stored thereon that, when executed by the processor, perform the following steps: identifying a set of structure joints, [J(j)], numbered 1 to n; creating a structure joint damage vector of length n, $[\Delta D_{joint}(j)]$, seeded with a starting value at each index, j, from 1 to n; identifying a set of structure response parameters, [p(i)], numbered 1 to m; creating a structure delta response vector, $[\Delta_{MEASURED}(i)]$, of length m; creating a structure sensitivity matrix, [C], of m rows and n columns, with each value of [C(i,j)] being a change in [p(i)] with respect to changes in $[\Delta D_{JOINT}(j)]$ for each index, i, from 1 to m and each index, j, from 1 to n; either (1) solving an equation of the form $[C][AD_{JOINT}]=[\Delta_{MEASURED}]$, or (2) optimizing an equation of the form $[C][\Delta D_{JOINT}]-[\Delta_{MEASURED}]=[M]=0$ to find values of $[\Delta D_{JOINT}]$ that minimize the error vector [M]; thus determining a structure joint damage vector of length n, $[\Delta D_{FIT}]$, containing the actual or best fit values for the structure joint damage vector at each index, j, from 1 to n; and comparing $[\Delta D_{FIT}]$ against a threshold value at each index, j, from 1 to n, thus identifying the location and severity of possible damages in structural joints of the structure.

The instructions when executed by the processor can further perform the following steps: defining a joint damage cutoff value a, such that $0 \le a \le 1$ defining a finite element (FE) model with inputs including $[\Delta D_{joint}(j)]$, and outputs including [p(i)] and [C]; identifying a set of structure reference parameters, [r(i)], numbered 1 to q, q being equal to m; calculating a value $[r_0(i)]$ for each index, i, from 1 to m, as the output [p(i)] from the FE model representing an initial or undamaged state of the structure with inputs including $\Delta D_{joint}(j)=0$, for each index, j, from 1 to n; calculating a $[p_j(i)]$ for each index, i, from 1 to m and each index, j, from 1 to n, as the output [p(i)] from the measurements taken at a second or damaged state of the structure; calculating [C(i,j)] as $[p_j(i)]-[r_0(i)]$ for each index, i, from 1 to m and each index, j, from 1 to n.

The instructions when executed by the processor can further perform the following steps: identifying a set of structure reference parameters (e.g., deflection, strain, frequency), [r(i)], numbered 1 to q, q being equal to m; calculating a value $[r_0(i)]$ for each index, i, from 1 to m, from measurements taken at an initial or undamaged state of the structure; calculating a $[p_j(i)]$ for each index, i, from 1 to m and each index, j, from 1 to n, from measurements taken at a second or damaged state of the structure; calculating [C(i,j)] as $[p_j(i)]-[r_0(i)]$ for each index, i, from 1 to m and each index, j, from 1 to n.

Embodiments of the subject invention may provide the size, m, of the set of response parameters [p] being less than the size, n, of the set of structure joints, [J]. Embodiments of the subject invention may provide the size, m, of the set of response parameters [p] being greater than the size, n, of the set of structure joints, [J]. Embodiments of the subject invention may provide the size, m, of the set of response parameters [p] being equal to the size, n, of the set of structure joints, [J]. The step of optimizing an equation of the form $[C][\Delta D_{JOINT}]-[\Delta_{MEASURED}]=[M]=0$ may include varying the respective values of $[\Delta D_{JOINT}]$ at each index, i from 1 to m, to minimize $\Sigma(M_i)^2$. The set of structure response parameters, [p], may be created by a sensor array including two or more sensors configured to capture responses of the structure at two or more locations under moving traffic loading. The set of structure response parameters, [p], may be created by a sensor array including two or more sensors configured to record responses of the structure at two or more locations under static test loading. The set of structure response parameters, [p], may be created by combining data collected in response to 2 or more different loading conditions.

In an embodiment, a method for identifying the location and severity of possible damages in structural joints of a structure by determining best fit values for a structure joint damage vector in the structure can include: identifying, by a processor, a set of structure joints, [J(j)], numbered 1 to n; creating, by the processor, a structure joint damage vector of length n, [$\Delta D_{joint}$(j)], seeded with a starting value at each index, j, from 1 to n; identifying, by the processor, a set of structure response parameters, [p(i)], numbered 1 to m; creating, by the processor, a structure delta response vector, [$\Delta_{MEASURED}$(i)], of length m; creating, by the processor, a structure sensitivity matrix, [C], of m rows and n columns, with each value of [C(i,j)] being a change in [p(i)] with respect to changes in [$\Delta D_{JOINT}$(j)] for each index, i, from 1 to m and each index, j, from 1 to n; either (1) solving, by the processor, an equation of the form [C] [$\Delta D_{JOINT}$]=[$\Delta_{MEASURED}$], or (2) optimizing, by the processor, an equation of the form [C][$\Delta D_{JOINT}$]−[$\Delta_{MEASURED}$]=[M]=0 to find values of [$\Delta D_{JOINT}$] that minimize the error vector [M]; thus determining a structure joint damage vector of length n, [$\Delta D_{FIT}$], containing the actual or best fit values for the structure joint damage vector at each index, j, from 1 to n; and comparing, by the processor, [$\Delta D_{FIT}$] against a threshold value at each index, j, from 1 to n, thus identifying the location and severity of possible damages in structural joints of the structure.

The method may further comprise the following steps: defining, by the processor, a joint damage cutoff value a, such that 0≤a≤1; defining, by the processor, a finite element (FE) model with inputs including [$\Delta D_{joint}$(j)], and outputs including [p(i)] and [C]; identifying, by the processor, a set of structure reference parameters, [r(i)], numbered 1 to q, q being equal to m; calculating, by the processor, a value [$r_0$(i)] for each index, i, from 1 to m, as the output [p(i)] from the FE model representing an initial or undamaged state of the structure with inputs including [$\Delta D_{joint}$(j)]=0, for each index, j, from 1 to n; calculating, by the processor, a [$p_j$(i)] for each index, i, from 1 to m and each index, j, from 1 to n, as the output [p(i)] measurements taken at a second or damaged state of the structure; calculating, by the processor, [C(i,j)] as [$p_j$(i)]−[$r_0$(i)] for each index, i, from 1 to m and each index, j, from 1 to n.

The method may further comprise the following steps: identifying, by the processor, a set of structure reference parameters, [r(i)], numbered 1 to q, q being equal to m; calculating, by the processor, a value [$r_0$(i)] for each index, i, from 1 to m, from measurements taken at an initial or undamaged state of the structure; calculating, by the processor, a [$p_j$(i)] for each index, i, from 1 to m and each index, j, from 1 to n, from measurements taken at a second or damaged state of the structure; calculating, by the processor, [C(i,j)] as [$p_j$(i)]−[$r_0$(i)] for each index, i, from 1 to m and each index, j, from 1 to n. The size, m, of the set of response parameters [p] may be greater than or less than the size, n, of the set of structure joints, [J]. The size, m, of the set of response parameters [p] may be equal to the size, n, of the set of structure joints, [J]. The structure joint damage vector, [$\Delta D_{joint}$], may be seeded with a starting value between 0 and 1 at each index, j from 1 to n. The set of structure response parameters, [p], may be created by a sensor array including two or more sensors configured to record responses of the structure at two or more locations under moving traffic loading. The set of structure response parameters, [p], may be created by a sensor array including two or more sensors configured to capture responses of the structure at two or more locations under static test loading. The set of structure response parameters, [p], may be created by combining data collected in response to 2 or more different loading conditions.

In an embodiment, a system for identifying the location and severity of possible damages in structural joints of a structure by determining best fit values for a structure joint damage vector in the structure can comprise: a processor; and a machine-readable medium in operable communication with the processor and having instructions stored thereon that, when executed by the processor, perform the following steps: identifying a set of structure joints, [J(j)], numbered 1 to n; creating a structure joint damage vector of length n, [$\Delta D_{joint}$(j)], seeded with a starting value at each index, j, from 1 to n; identifying a set of structure response parameters, [p(i)], numbered 1 to m; creating a structure delta response vector, [$\Delta_{MEASURED}$(i)], of length m; creating a structure sensitivity matrix, [C], of m rows and n columns, with each value of [C(i,j)] being a change in [p(i)] with respect to changes in [$\Delta D_{JOINT}$(j)] for each index, i, from 1 to m and each index, j, from 1 to n; either (1) solving an equation of the form [C][$\Delta D_{JOINT}$]=[$\Delta_{MEASURED}$], or (2) optimizing an equation of the form [C] [$\Delta D_{JOINT}$]−[$\Delta_{MEASURED}$]=[M]=0 to find values of [$\Delta D_{JOINT}$] that minimize the error vector [M]; thus determining a structure joint damage vector of length n, [$\Delta D_{FIT}$], containing the actual or best fit values for the structure joint damage vector at each index, j, from 1 to n; comparing [$\Delta D_{FIT}$] against a threshold value at each index, j, from 1 to n, thus identifying the location and severity of possible damages in structural joints of the structure; defining a joint damage cutoff value a, such that 0≤a≤1; defining a finite element (FE) model with inputs including [$\Delta D_{joint}$(j)], and outputs including [p(i)] and [C]; identifying a set of structure reference parameters, [r(i)], numbered 1 to q, q being equal to m; calculating a value [$r_0$(i)] for each index, i, from 1 to m, as the output [p(i)] from the FE model representing an initial or undamaged state of the structure with inputs including [$\Delta D_{joint}$(j)]=0, for each index, j, from 1 to n; calculating a [$p_j$(i)] for each index, i, from 1 to m and each index, j, from 1 to n, as the output [p(i)] from the measurements taken at a second or damaged state of the structure; calculating [C(i,j)] as [$p_j$(i)]−[$r_0$(i)] for each index, i, from 1 to m and each index, j, from 1 to n; the size, m, of the set of response parameters [p] being greater than the size, n, of the set of structure joints, [J]; the structure joint damage vector, [$\Delta D_{joint}$], being seeded with a starting value between 0 and 1 at each index, j from 1 to n; the step of optimizing an equation of the form [C] [$D_{JOINT}$]−[$\Delta_{MEASURED}$]=[M]=0 including varying the respective values of [$\Delta D_{JOINT}$] at each index, i from 1 to m, to minimize $\Sigma(M_i)^2$; and the set of structure response parameters, [p], being created by a sensor array including two or more sensors configured to capture responses of the structure at two or more locations under moving traffic loading or under static test loading in response to 2 or more different loading conditions.

BRIEF DESCRIPTION OF DRAWINGS

FIG. 10 is a depiction of a user interface panel for a structural joint damage detector tool, in accordance with the subject invention as used in Example 1.

DETAILED DESCRIPTION

Figure 1:
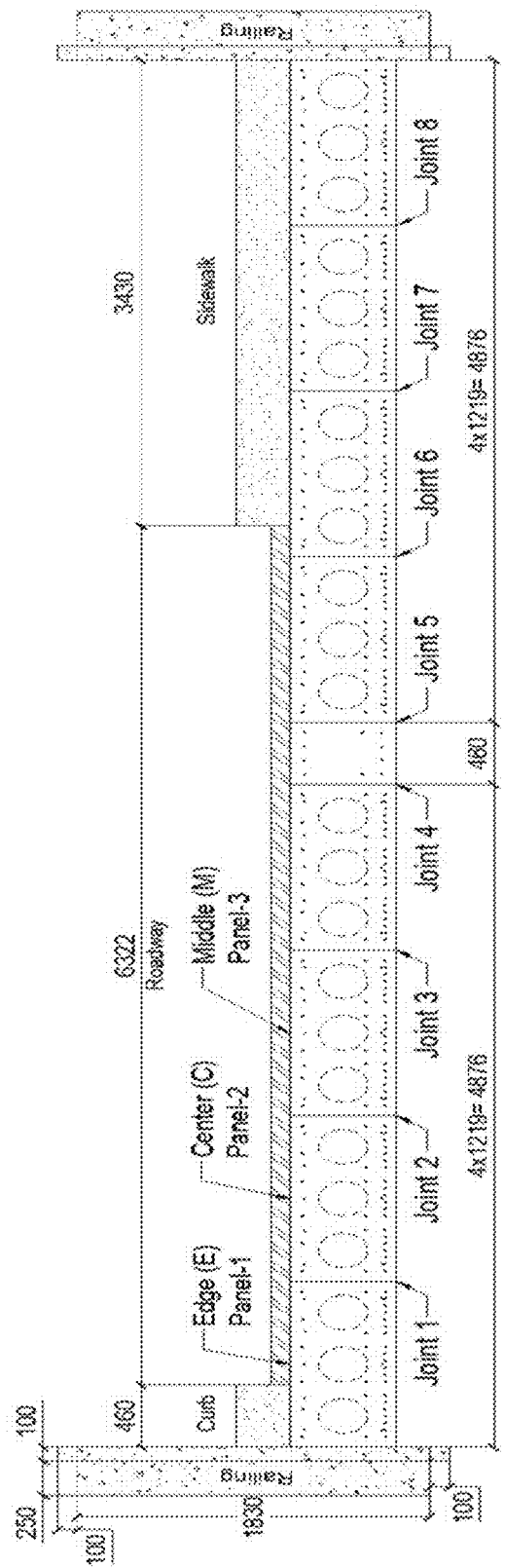
FIG. 1 is a cross sectional view of a bridge selected for analysis by certain systems and methods of the subject invention in Example 1.

Embodiments of the subject invention provide novel and advantageous tools and method for joint damage detection in structures, including for example, bridge structures constructed using accelerated bridge construction (ABC, e.g., in which prefabricated concrete components are used on-site in the construction of a bridge or other structure to minimize on-site construction time.) In certain embodiments static or dynamic bridge load testing provides data input to a system which allows for a more frequent and cost-effective bridge performance monitoring, allowing structural issues to be addressed at shorter intervals. Thus, the system can detect potential failures leading to collapse long before an incident arises.

In certain embodiments systems and methods are provided to detect the location of joint damage as well as the relative significance of damage at one or more individual joints in an ABC bridge based on the measured changes in bridge dynamic or static response parameters and damage model updating methods. This method may use a detailed finite element model to calculate the sensitivity of joint damages in the bridge response parameters for a particular loading configuration and the change of state in the bridge obtained through instrumentation and response monitoring of the structure compared to the intact condition to identify and evaluate the severity of damage to the bridge.

Certain embodiments allow for more frequent and cost-effective methods of bridge performance monitoring, ensuring that structural issues are addressed at shorter intervals, and can advantageously detect potential failures leading to collapse long before an incident arises. This method can detect the location and severity of hidden damages in the bridge joints which may then in some instances be confirmed using visual inspection. Embodiments of the present invention may provide advantages over common monitoring techniques for inspecting bridges (e.g., visual inspection) especially in cases involving heavily loaded or highly engineered critical structures. Embodiments of the subject invention may provide a reliable way to determine the actual health of a structure more rapidly, with greater accuracy, and with a more quantitative or deterministic representation of risk.

In certain embodiments the tools and methods can be used for periodic or continuous monitoring of ABC bridge joints during normal operation. This approach allows for more frequent and cost-effective methods of bridge performance monitoring, ensuring that structural issues are addressed at shorter intervals, and can detect potential failures leading to collapse long before an incident arises. The methods of embodiments of the subject invention can detect the location and severity of hidden damages in bridge joints that are not detectable using visual inspection.

Additionally, certain embodiments of the subject invention can detect damages to joints and connections of any other structure, other than bridges, that uses prefabricated elements. It can also detect damages at joints of conventional structures which do not utilize prefabricated elements as well as hybrid structures using any combination of prefabricated and site-built elements.

Turning now to the figures, FIG. 1 is a cross sectional view of a bridge selected for analysis by certain systems and methods of embodiments of the subject invention in Example 1. The bridge superstructure consists of 0.55 m (21.7 in.) deep by 1.2 m (48 in.) wide precast-prestressed concrete voided slab units supported on two abutments with pile foundations. The bridge section consists of a 6.3 m (20 ft 8 in.) vehicular travel lane with 95 mm (3.7 in.) asphalt overlay and a 0.5 m (18 in.) wide raised curb and a 3.4 m (11 ft 3 in.) raised sidewalk with a total width of 10.9 m (33 ft 6 in.). The bridge railing consists of 100 mm (4 in.) thick architectural panels extending to the bottom of the concrete deck connected to the bridge slab units using steel angles. Three panels (Panel-1, Panel-2, and Panel-3; also labeled as Edge(E), Center(C), and Middle(M), respectively) and eight joints (Joint 1, Joint 2, Joint 3, Joint 4, Joint 5, Joint 6, Joint 7, and Joint 8) are indicated, along with Roadway, Sidewalk, Curb, and Railings of the bridge.

Figure 2:
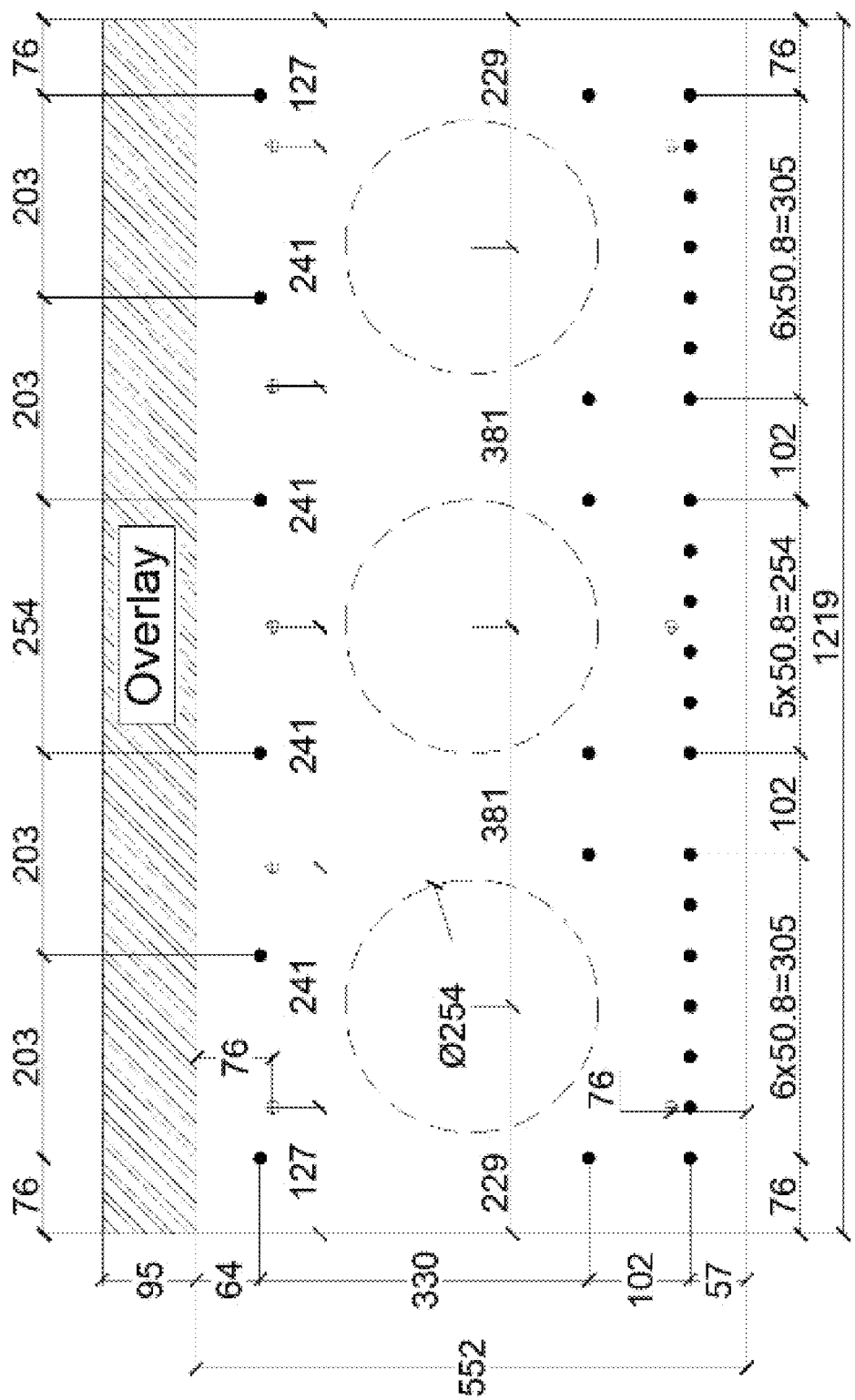
FIG. 2 is a depiction of the cross-section detail of a precast concrete exterior panel in Example 1.

FIG. 2 is a depiction of the cross-section detail of a precast concrete exterior panel in Example 1. The excavation allowed identification of the position, number and size of pre-stressing strands and reinforcing bars as well as the concrete strength. The precast concrete slab is prestressed with three rows of 7-wire, 12.7 mm (0.5 in.) diameter strands, symmetrically positioned. The compression (top) row has 6 strands, while the tension (bottom) rows have 6+20. The drawing shows the cross-section with details of reinforcement and dimensions.

Figure 3:
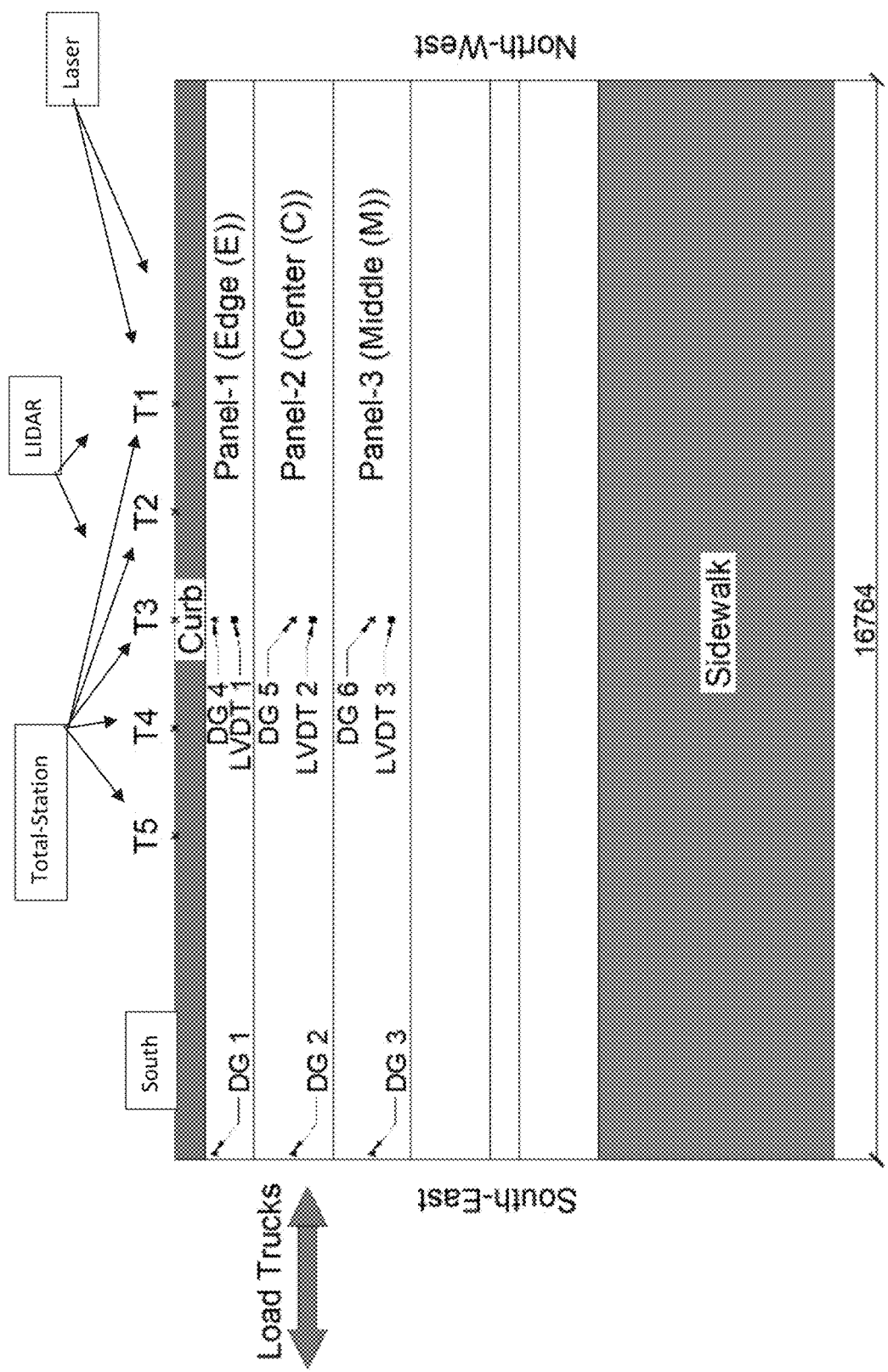
FIG. 3 is a depiction of the position of instrumentation and targets used to measure displacements during and after a load test of a bridge in Example 1.

FIG. 3 is a depiction of the position of instrumentation and targets used to measure displacements during and after a load test of a bridge in Example 1. Vertical deflection of deck panels was recorded during the bridge diagnostic load test. Measurements were evaluated for the first three precast concrete slab units closest to the South edge of the bridge. These slab units were selected since they were directly under the truck wheels, which formed the roadway portion of the bridge. These slab units were considered the most critical. Their monitoring also allows for the evaluation of shear transfer among them. The slab units are herein identified as: Panel-1 (Edge (E)), i.e., the panel on the South edge of the bridge with a 0.46 m curb on top of it; Panel-2 (center (C)), the panel next to the edge panel; and Panel-3 (Middle (M)) that is the panel next to the center panel in the middle of the roadway.

Four types of instruments were employed during the evaluation of the bridge diagnostic load test in Example 1: (1) Dial gauges; (2) Linear variable displacement transducers (LVDT); (3) total-station (model #TS16, Leica Geosystems AG, Switzerland) and its targets; and (4) LIDAR (model #RTC360, Leica Geosystems AG, Switzerland): 3D laser scanner. A laser vibrometer (model #PDV 100, Polytec GmbH, Germany) (denoted as Laser, in FIG. 3) was also used for recording bridge vibration during the dynamic load test, in accordance with the subject invention as used in Example 1. Dial gauges DG1 through DG6, transducers LVDT 1 through LVDT 3, and total station targets T1 through T5, are marked in FIG. 3. The LIDAR measurement as depicted in FIG. 3 does not require specific target or sensor locations on the structure. A laser vibrometer as depicted in FIG. 3 was simply stationed near the bridge with no need for direct access to the bridge. In addition, an accelerometer was located at mid-span over the curb. The bridge vibration at mid-span was captured under moving traffic loading.

Figure 4:
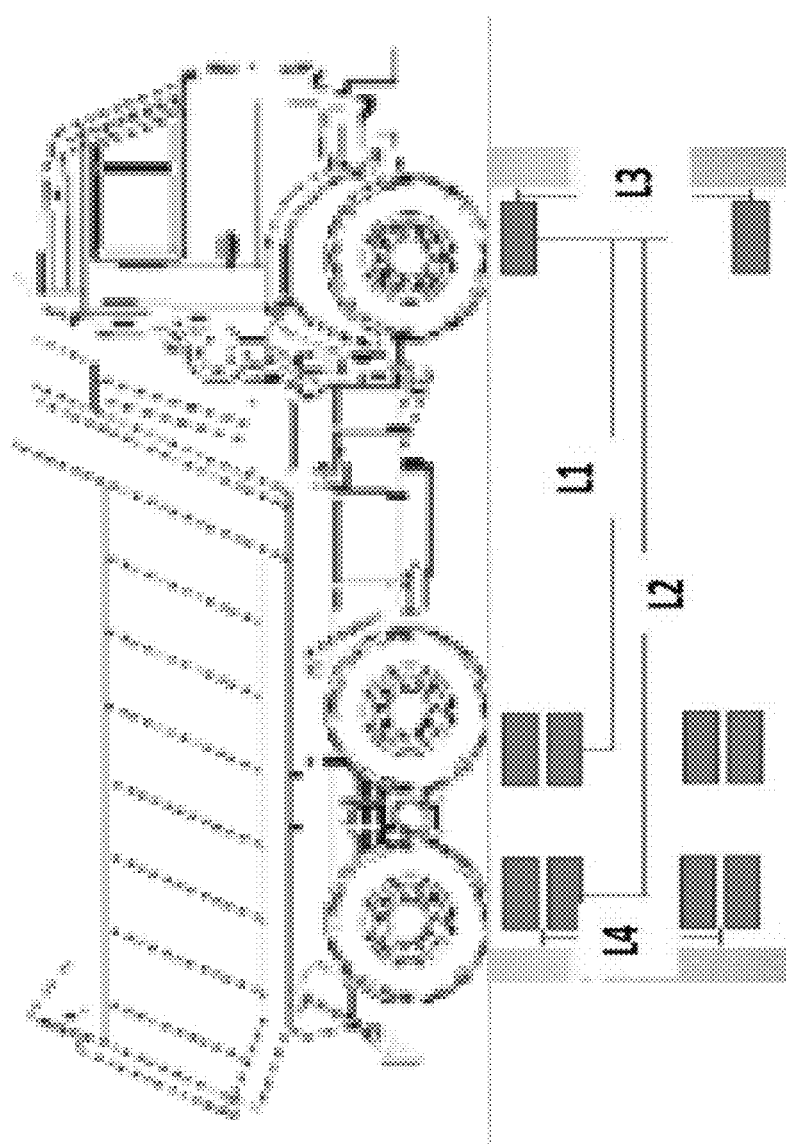
FIG. 4 is a depiction of truck dimensions nomenclature used in Example 1.

FIG. 4 is a depiction of truck dimensions nomenclature, as used in Example 1. Loading was applied by means of two medium duty three-axle HL-93 type trucks: an empty truck (E) and a fully loaded truck (L). The empty truck was used for two purposes: a) for safety purposes to apply an initial lower load to check the integrity of the bridge; and, b) once safety was confirmed, data provided by the application of the empty truck can be used to further validate the development of an FE model in accordance with certain embodiments of the subject invention.

Figure 5:
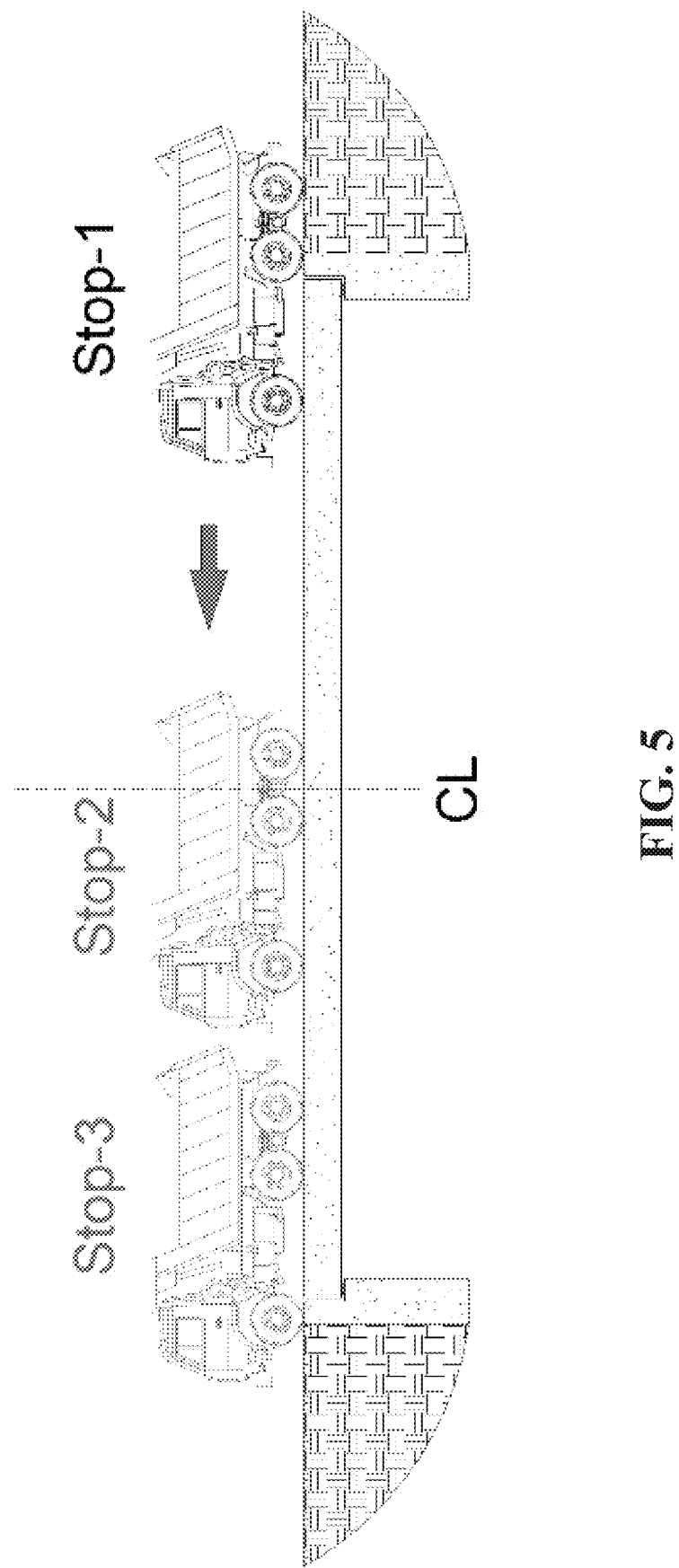
FIG. 5 is a depiction of truck stops relative to the bridge span, in accordance with the subject invention as used in Example 1.

FIG. 5 is a depiction of truck stops relative to the bridge span, in accordance with an embodiment of the subject invention as used in Example 1. For each pass, three (3) different stops were made on the bridge. Measurements of vertical deflection were then recorded with all instruments at each stop. The figure provides a sketch of the stops relative to the bridge span passes 1 and 2 are left to right mirror images of each other as the truck crossed back over the bridge in the opposite direction; and passes 3 and 4 are left to right mirror images of each other as the truck crossed back over the bridge in the opposite direction. For each pass, Stop 1 was with the rear double axle just outside the bridge span, the remainder of the truck on the bridge. For each pass, Stop 2 was with the rear double axle center at the mid-span (considered the worst load condition). For each pass, Stop 3 was with the front axle just outside the opposite side of the bridge span, and the remainder of the truck on the bridge.

Figure 6:
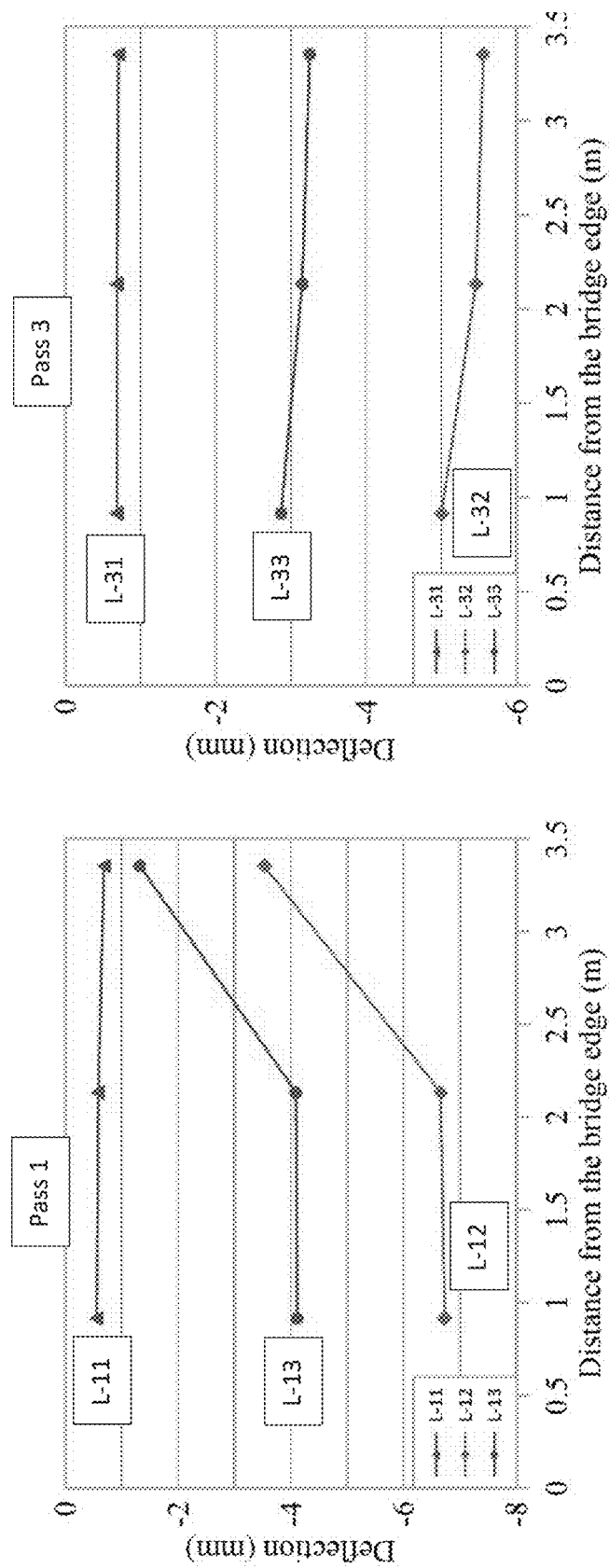
FIG. 6 is a depiction of dial gauge displacement measurements for the three instrumented panels relative to pass number one in the left chart and pass number three in the right chart, respectively, in accordance with the subject invention as used in Example 1.

FIG. 6 shows the panel deflection under the loaded truck in pass 1 (L-11, L-12, and L-13, respectively) and in pass 3 (L-31, L-32, and L-33, respectively). LVDTs recorded in real time the deflection of each slab unit while the truck moved from one position to the next; thus, providing additional information that can aid in the analysis of the bridge, in accordance with an embodiment of the subject invention as used in Example 1.

Figure 7:
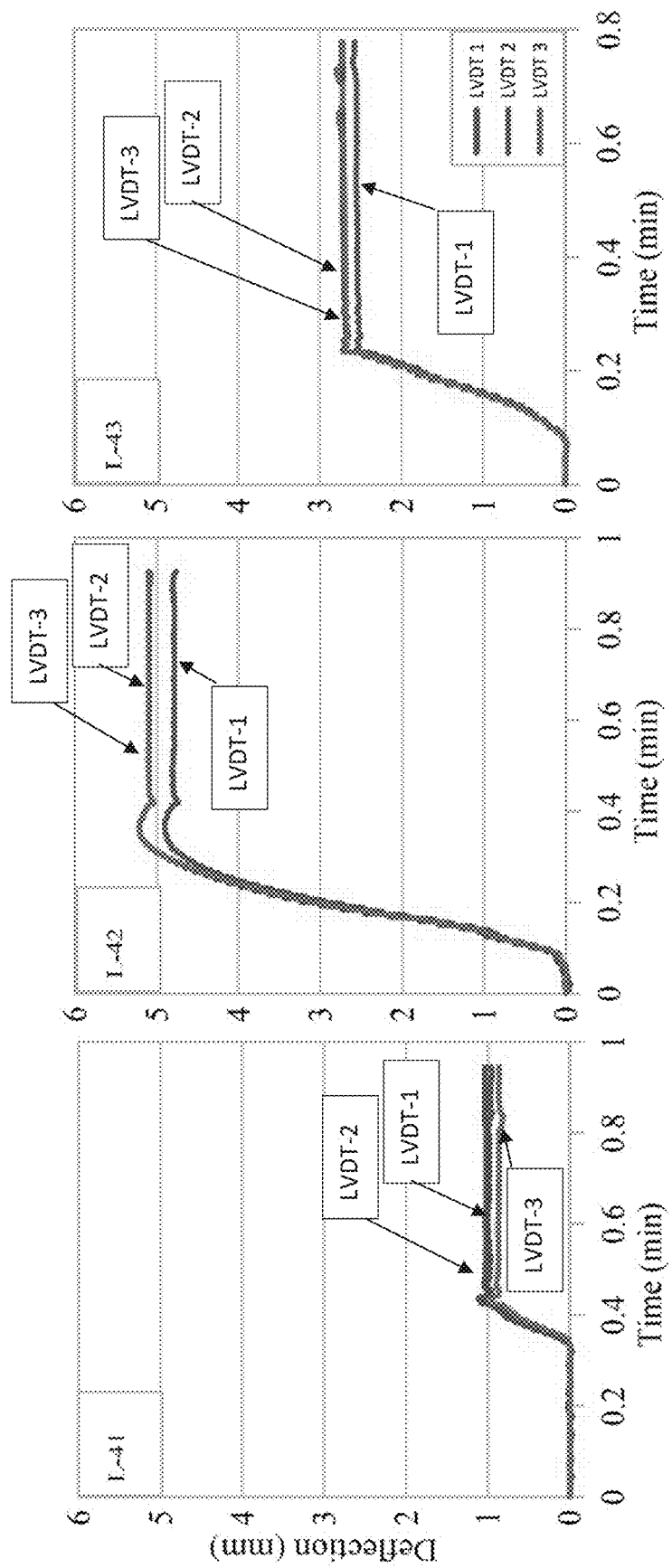
FIG. 7 is a depiction of representative vertical displacement versus time during the load test for pass 4-stop 1 (left chart), pass 4-stop 2 (middle chart), and pass 4-stop 3 (right chart), in accordance with the subject invention as used in Example 1.

FIG. 7 is a depiction of representative vertical displacement versus time during the load test for pass 4-stop 1 (L-41, left chart), pass 4-stop 2 (L-42, middle chart), and pass 4-stop 3 (L-43, right chart), in accordance with an embodiment of the subject invention as used in Example 1. Each chart shows a representative mid-span vertical displacement (for each slab unit) versus time graph for each stop during pass 4 with the loaded truck.

Figure 8:
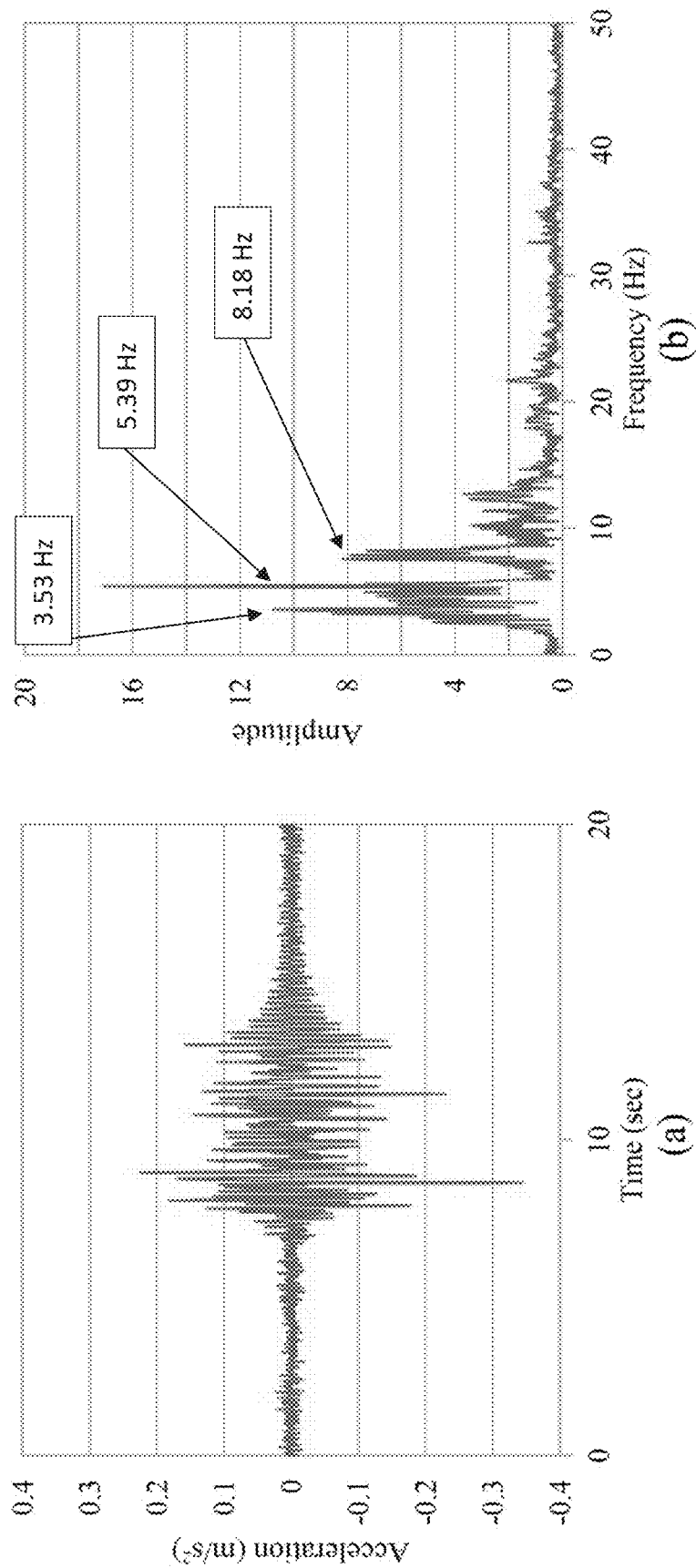
FIG. 8 is a depiction of bridge vibration subjected to truck loading, where the left chart shows time history, and the right chart shows frequency spectrum, in accordance with the subject invention as used in Example 1.

FIG. 8 is a depiction of bridge vibration subjected to truck loading, where the left panel shows time history captured using the laser vibrometer, and the right panel shows frequency spectrum obtained using Fast Fourier Transform (FFT), each obtained from the dynamic test in accordance with an embodiment of the subject invention as used in Example 1. Based on the results, the first three bridge frequencies were obtained as 3.53 Hz, 5.39 Hz and 8.18 Hz. In accordance with certain embodiments of the subject invention, bridge frequencies may be used as parameters for optimization of values including joint damage.

Figure 9:
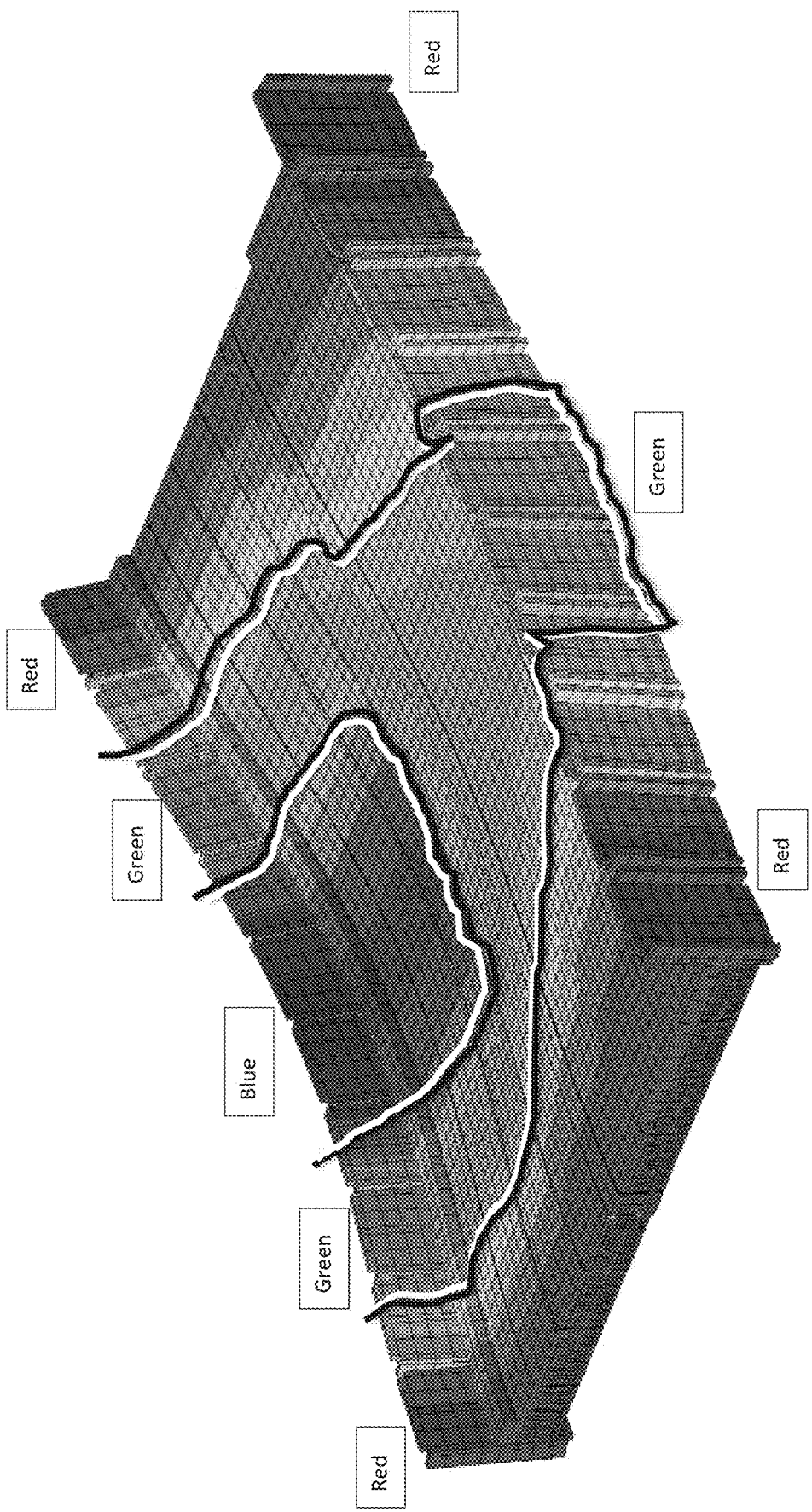
FIG. 9 is a depiction of a finite element model of a bridge, in accordance with the subject invention as used in Example 1.

FIG. 9 is a depiction of a finite element model (FE) of a bridge subjected to the truck loading, in accordance with an embodiment of the subject invention as used in Example 1. In FIG. 9, red contour corresponds to the range of 0 to −0.05 inch displacement, green contour corresponds to the range of −0.05 to −0.17 inch displacement, and blue contour corresponds to the range of −0.17 to −0.27 inch displacement. A detailed FE model was developed for the bridge superstructure in the environment of ABAQUS (Dassault 2016) with the objective of contributing to the analysis of the experimental results as well as investigating the behavior of the panel joints. In the FE analysis, steel reinforced concrete slab units were modeled as discussed in Example 1. Visual inspection of the asphalt overlay surface and pedestrian concrete sidewalk showed reflective longitudinal cracks and leakage along the bridge that match the locations of the slab unit edges. Moreover, non-monolithic panel deflection in the load test (e.g., as indicated in FIG. 6) indicates closure joint damage that affected the bridge integrity.

Figure 10:
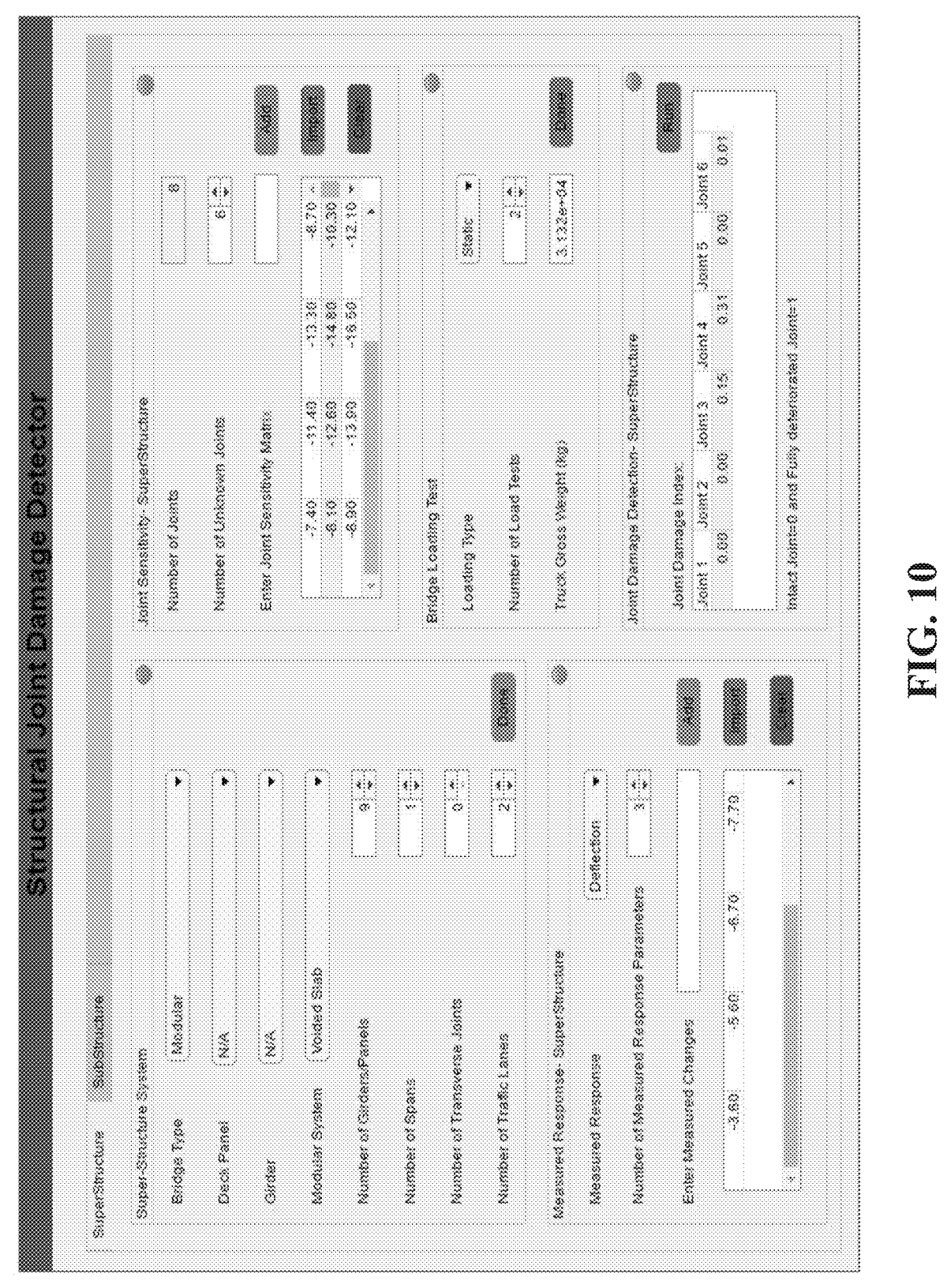

FIG. 10 is a depiction of a user interface panel for a structural joint damage detector tool, in accordance with an embodiment of the subject invention as used in Example 1 for bridge joint damage detection including bridge configuration, measured responses, joint sensitivity, bridge loading test and damage detection data from Example 1.

Embodiments of the subject invention provide systems and methods to detect the location of potential joint damage and the relative significance of each respective joint damage in the structure (e.g., bridge) based on the measured changes in structure dynamic or static response parameters and model updating methods. In certain embodiments the method advantageously compares structure responses (e.g., deflection, strain, slope, or vibration frequency) to the respective initial undamaged structure responses subjected to a known loading condition (e.g., by recreating the same static or dynamic loading configuration) to identify individual joint damage conditions.

In some embodiments, structure (e.g., bridge) components are modeled as connected through joints with different stiffness (E) to indirectly simulate various levels of damage. Therefore, intact joints with no damage may be assigned a stiffness equal to that of the adjacent component, and a completely deteriorated joint with no structural load carrying capacity may be assigned zero stiffness. Using this method, different stiffness between that of a severely damaged joint (e.g., $E_{Damaged}$ is zero, near zero, or a relatively small value) and that of an intact joint (e.g., $E_{Damage}d$ is one, near one, or a relatively large value) can be assigned to each joint based on the level of damage at the joint and a damage index ($\Delta D_{JOINT}$) can be defined for each joint as Equation (1).

$$\Delta D_{JOINT} = 1 - (E_{Damaged}/E_{Intact}) \quad (1)$$

where for an intact joint $\Delta D_{JOINT}=0$ and for a fully deteriorated joint $\Delta D_{JOINT}=1$.

Certain embodiments of the subject invention may provide a unique set of damage indexes for the joints that result in a bridge response matching with an experimental load test for selected available loading configurations. Although for each loading configuration different sets of damage indexes could be found to match the bridge responses, a unique set of damage indexes can be found which are optimized to satisfy certain selected loading configurations. To this end, embodiments of the subject invention may further provide a new model updating method to find the damage index for each joint in a measured structure (e.g., in an ABC bridge.) In this method, bridge responses are measured using static or dynamic load tests, and a FE model of the bridge is used to compare the analytically predicted responses and the bridge measured responses. The joint damage indexes are then updated through an optimization algorithm until the differences are minimized to a predefined threshold. In cases where an initial response measurement is available for the bridge immediately after construction or in an alternative baseline condition assuming undamaged or nearly undamaged joint conditions, then the comparison may be advantageously referenced between current response measurements and the initial response measurement. Alternatively, in the absence of initial measurements, the analytical responses from a calibrated FE model can be used as an initial measurement.

Parameter Identification

In accordance with certain embodiments of the subject invention, the joint damage indexes can be updated or adapted such that structural response parameters obtained from analytical models for various loading configurations are predicted with acceptable accuracy. The solution may therefore involve the application of optimization methods. The identified changes in the bridge responses are used to determine whether or not there is any deterioration in the joints.

The basic force-displacement relationship for the bridge can be written as $$[F]=[K][v] \qquad (2)$$

where F is the vector of applied forces, K is the stiffness matrix, and v is the vector of nodal displacement. The selected measured parameter may be panel deflection, strain, stress, or any other quantity of interest. These measured parameters are related to nodal displacement by the following equation:

$$[P]=[B][v] \qquad (3)$$

where the transformation matrix B relates the response parameter to nodal displacement. Since only some response parameters are measured through load tests, Equation (2) is partitioned into measured $[v_a]$ and unmeasured $[v_b]$ response parameters:

$$\begin{bmatrix} f_a \\ f_b \end{bmatrix} = \begin{bmatrix} k_{aa} & k_{ab} \\ k_{ba} & k_{bb} \end{bmatrix} \begin{bmatrix} v_a \\ v_b \end{bmatrix} \qquad (4)$$

Equation (4) is reduced to Equation (5) by condensing out the unmeasured response parameters:

$$[f_a]=[k_{aa}]-[k_{ab}][k_{bb}]^{-1}[k_{ba}][v_a]+[k_{ab}][k_{bb}]^{-1}[f_b] \qquad (5)$$

Matrices related to forces ($[f_a]$ and $[f_b]$) and measured response parameters $[v_a]$ can be obtained from the load test results, and the analytical stiffness matrices are functions of joints and bridge components stiffness (p) that depend on the joint damage index. An error vector is defined as Equation (6) to identify the stiffness parameters:

$$[E(p)]=[[k_{aa}]-[k_{ab}][k_{bb}]^{-1}[k_{ba}]][v_a]+[k_{ab}][k_{bb}]^{-1}[f_b]-[f_a] \qquad (6)$$

For the intact bridge, the stiffness parameters (here damage indexes) would be zero; however, for the damaged bridge this parameter will not be zero. To adjust the stiffness parameter [p] in [E(p)], a first-order Taylor series expansion is used for linearizing the error matrix [E(p)] by neglecting higher order terms and a scalar performance error function is defined as follows:

$$[E(p+\Delta p)] \approx [E_p]+[S_p][\Delta_p] + \text{higher order terms} \qquad (7)$$

$$[S_p]=\left[\frac{\partial \{E(p)\}}{\partial \{p\}}\right] \qquad (8)$$

$$J(p+\Delta p)=[E(p+\Delta p)]^T[E(p+\Delta p)] \qquad (9)$$

By minimizing Equation (9) with respect to the unknown parameters [p].

$$\frac{\partial J(p+\Delta p)}{\partial \{p\}}=\{0\} \qquad (10)$$

Equation (11) is derived from Equations. (7-10)

$$-[S_p][\Delta p]=\{Ep\} \qquad (11)$$

For the case of ABC bridges,

E(p)~changes in bridge response due to change in joint stiffness $[\Delta p] \approx [\Delta D_{Joint}]$=factor of damage indexes or change of stiffness of joints $-[S_p]$=C sensitivity matrix Hence:

$$[C]\{\Delta D_{joint}\}=\{E(p)\} \qquad (12)$$

Implementation of Damage Detection Procedure

According to certain embodiments of the subject invention, a detailed finite element (FE) model can be used to calculate the sensitivity matrix C for a particular loading configuration (e.g., as depicted in FIG. 9). Calculated bridge responses can be obtained from FE analysis for the intact bridge as a selected measured parameter (i=joint number for which bridge response is measured from 1 to n, j=panel number for which bridge response is measured from 1 to m). Then, by applying full damage (e.g., at zero stiffness) to each respective joint in turn (Joint j), while keeping the other joints intact (e.g., at full stiffness), these responses are recalculated at i points. The change of the bridge response with each respective individual joint damaged compared to the intact bridge, will form the column j of the desired sensitivity matrix C, of size (nxm). Therefore, each column of the matrix C represents a pattern in state change associated with a full damage ($\Delta D_{JOINT}$=1) at a certain joint. The actual change of state in the bridge, can be obtained through instrumentation and response monitoring of the structure compared to the intact condition (e.g., actual measured undamaged bridge response, or calculated reference undamaged bridge response.) The monitoring can be conducted in a continuous manner by installing permanent measuring devices to monitor the bridge response under traffic passing by or can be carried out periodically using load test results (e.g., as described in Example 1). Having determined the non-singular sensitivity matrix C (resolving the case where C in singular was added) and {E(p)}, the vector of damage indexes $\Delta D_{JOINT}$ can thus be calculated in accordance with the methods of embodiments of the subject invention. If the sensitivity matrix is ill-conditioned or singular by errors, it may not be inverted with high precision. In this case, the singular value decomposition (SVD) method can be used to solve an ill-conditioned system of equations instead of using direct inversion or the least-squares method.

Embodiments of the subject invention may in certain aspects account for measurement errors in bridge load test procedure which could corrupt {E(p)} resulting in a false $\Delta D_{JOINT}$. To reduce random errors, more load cases can be performed during tests, or the same test may be repeated several times (e.g., collecting an average measurement), or more response parameters than unknown damages may be recorded. Moreover, modeling approximations related to material properties, bridge geometry and boundary conditions always exist in developing a FE model of the bridge. Additionally, potential damage sources other than joint damage included in developing the C matrix could result in false damage identification. The C matrix is the sensitivity matrix including predetermined damages for any damage in the bridge for a particular loading configuration. The matrix can be obtained only using a FE model and there is no need for calculating C for an undamaged bridge.

In a determinate system solution, the number of damage indexes and the number of measured responses must be the same. However, if the number of response parameters is larger than the number of damage indexes, the problem is over-determinant. In this case, rather than directly solving Equation (12) for the unknown damage indexes, embodiments of the subject invention provide an optimization procedure where the problem can be restated as an optimization problem to minimize the error. If the number of unknowns (n) is larger than the number of response parameters (m), the problem is under-determinant and different load cases are required from the load testing (e.g., truck position) to derive the damages from the limited number of measurements. This case can also be restated as an optimization problem to find the best damage indexes matching different load cases.

In accordance with certain aspects of the subject invention, a tool is developed to detect the location and severity of possible damages in ABC bridge joints including superstructure and substructure joints. In this tool, bridge configuration, measured changes in the bridge response, loading configurations and a joints sensitivity matrix will be used as input parameters to detect the location of the joint damage and their relative significance in the bridge using an optimization algorithms to consider the errors associated with modeling, measurement and ignoring other potential sources of damages (e.g., as depicted in FIG. 10).

As used herein, the terms "about" and "approximately" shall generally mean an acceptable degree of error for the quantity measured given the nature or precision of the measurements. Exemplary degrees of error are within 20 percent (%), typically, within 10%, and more typically, within 5% of a given value or range of values. As used herein, the term "and/or" should be understood to mean "either or both" of the features so conjoined, i.e., elements that are conjunctively present in some cases and disjunctively present in other cases.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

References to a bridge, bridges, ABC or other specific types of bridges are by way of illustrative example and should not be construed as limiting. The subject invention contemplates applications and embodiments encompassing many different structures, construction methods, or materials. References to specific sensors and measured parameters are by way of illustrative example and should not be construed as limiting. The subject invention contemplates any measurement, data collection, and parameter input devices or sources appropriate to the structure being evaluated.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1—Analysis of an Existing Bridge Structure

Bridge Description

The College Drive Bridge (CDB) located at the University of Miami campus was selected for measurement and analysis. This bridge is a simple span structure with an approximate length equal to 16.7 m (55 ft) that has been in service for more than 50 years (FIG. 1). The bridge superstructure consists of 0.55 m (21.7 in.) deep by 1.2 m (48 in.) wide precast-prestressed concrete voided slab units supported on two abutments with pile foundations. The bridge section consists of a 6.3 m (20 ft 8 in.) vehicular travel lane with 95 mm (3.7 in.) asphalt overlay and a 0.5 m (18 in.) wide raised curb and a 3.4 m (11 ft 3 in.) raised sidewalk with a total width of 10.9 m (33 ft 6 in.). The bridge railing consists of 100 mm (4 in.) thick architectural panels extending to the bottom of the concrete deck connected to the bridge slab units using steel angles as shown in FIG. 1.

Because no design and construction records were available (the bridge is not included in the United States National Bridge Inventory (NBI)), a series of site inspections were conducted using nondestructive testing (NDT) such as ground penetrating radar (GPR). Given that historical information and site inspections were not sufficient to confirm the type of cross-section of the slab units of the bridge, an excavation at the adjacent twin pedestrian bridge was performed to expose the end of the edge precast concrete slab unit. During this process, four core samples were also extracted to evaluate the strength of the concrete. The twin pedestrian bridge is identical to the CDB selected for this study.

The excavation allowed identification of the position, number and size of pre-stressing strands and reinforcing bars as well as the concrete strength. Based on this, it was possible to determine that the precast concrete slab is prestressed with three rows of 7-wire, 12.7 mm (0.5 in.) diameter strands, symmetrically positioned. The compression (top) row has 6 strands, while the tension (bottom) rows have 6+20. FIG. 2 shows an illustration of the end of the exposed concrete slab and the drawing corresponding to the cross-section with details of reinforcement and dimensions. Since it was not possible to test strands and reinforcing bars to determine their mechanical characteristics, Grade 250 SR with the minimum tensile strengths of 1725 MPa (250 ksi) for strands and Grade 40 with the minimum yield strength of 275 MPa (40 ksi) for reinforcing bars are assumed for the analysis in this study based on the typical material properties at the time of the bridge construction. For the prestressed slab unit, the average concrete compressive strength based on three sample cores tested according to ASTM C39 (ASTM 2012) was equal to 36.4 MPa (5.28 ksi).

Bridge Instrumentation and Load Testing

Vertical deflection of deck panels was recorded during the bridge diagnostic load test. Measurements were evaluated for the first three precast concrete slab units closest to the South edge of the bridge. These slab units were selected since they were directly under the truck wheels, which formed the roadway portion of the bridge. These slab units were considered the most critical. Their monitoring also allows for the evaluation of shear transfer among them. The slab units, as represented in FIG. 3, are herein identified as: Panel-1 (Edge (E)), i.e., the panel on the South edge of the bridge with a 0.46 m curb on top of it; Panel-2 (center (C)), the panel next to the edge panel; and Panel-3 (Middle (M)) that is the panel next to the center panel in the middle of the roadway.

Four types of instruments were employed during the evaluation of the bridge diagnostic load test: i) Dial gauges; ii) Linear variable displacement transducers (LVDT); iii) Total-station (model #TS16, Leica Geosystems AG, Switzerland) and its targets; and (iv) LIDAR (model #RTC360, Leica Geosystems AG, Switzerland): 3D laser scanner. FIG. 3 shows the relative location of the instruments.

Loading Procedure

Loading was applied by means of two medium duty three-axle HL-93 type trucks: an empty truck (E) and a fully loaded truck (L), as depicted in FIG. 4. The empty truck was used for two purposes: a) for safety purposes to apply an initial lower load to check the integrity of the bridge; and, b) once safety was confirmed, data provided by the application of the empty truck can be used to further validate the development of an FE model.

Each truck weight was measured immediately prior to the load test in three different ways at a certified and accredited weight station. The first weight measurement was the front (steer) axle only, the second was the rear (drive) double axle only, and the third was the total gross weight. Table 1 reports the different weights as well as the geometrical dimensions of each truck for reference purposes.

Each truck made four (4) different passes (for a total of eight (8) passes given two vehicles) driving across the bridge in both North/West and South/East bound directions.

Pass 1: the truck drove from South/East to North/West driving next to the curb, with one set of wheels directly on Panel-1.

Pass 2: this was the reverse of Pass 1; the truck drove from North/West to South/East driving next to the curb, with one set of wheels loading directly on Panel-1.

Pass 3: the truck drove from South/East to North/West with one set of wheels directly over mid-width on Panel-2.

Pass 4: as the reverse of Pass 3, the truck drove from North/West to South/East driving directly mid-width on Panel-2.

For each pass, three (3) different stops were made on the bridge. Measurements of vertical deflection were then recorded with all instruments at each stop. FIG. 5 shows a sketch of the stops relative to the bridge span; based on this, passes 1, 2 and 3, 4 are mirror images of each other.

Stop 1 was with the rear double axle just outside the bridge span, the remainder of the truck on the bridge.

Stop 2 was with the rear double axle center at the mid-span (considered the worst load condition).

Stop 3 with the front axle just outside the opposite side of the bridge span, and the remainder of the truck on the bridge.

TABLE 1

Trucks specifications.

| Truck | Truck Weight (kg) | | | Truck Dimensions* (m) | | | |
| --- | --- | --- | --- | --- | --- | --- | --- |
| | Steer Axle | Drive Axle | Gross Weight | L1 | L2 | L3 | L4 |
| Empty Truck (E) | 5452 | 6142 | 11594 | 5.3 | 6.7 | 2.1 | 1.9 |
| Loaded Truck (L) | 8119 | 23197 | 31316 | 4.5 | 5.9 | 2.2 | 1.9 |

*Refer to FIG. 4 for length reference (1.0 kg = 2.2 lb; 1.0 m = 39.4 in.)

Measured Bridge Response

Results are summarized in Table 2. The results presented herein include only the net deflections from the application of the loaded truck. Empty truck data are not reported in this section, as this loading condition was to provide initial safety verification prior to loading with the full truck. Stop 2 in all the measurements corresponds to the worst-case scenario, as the center of the rear double axle was located at the bridge mid-span. The other stops provide additional information on the overall performance of the bridge.

TABLE 2

Summary results of net vertical deflections at mid-span for loaded truck

| Instrument | Slab Unit | Pass-Stop Number-Deflection (mm) | | | | | | | | | | | |
|---|---|---|---|---|---|---|---|---|---|---|---|---|
| | | 11 | 12 | 13 | 21 | 22 | 23 | 31 | 32 | 33 | 41 | 42 | 43 |
| LVDT | Panel-1 | 1.57 | 6.53 | 3.10 | 1.24 | 6.35 | 6.71 | 1.14 | 4.65 | 2.49 | 1.09 | 4.95 | 2.62 |
| | Panel-2 | 1.35 | 6.45 | 2.84 | 1.14 | 6.73 | 6.27 | 1.02 | 5.21 | 2.54 | 1.12 | 5.21 | 2.74 |
| | Panel-3 | 2.31 | 5.97 | 2.59 | 1.02 | 5.89 | 5.84 | 0.84 | 5.33 | 2.57 | 0.97 | 5.23 | 2.82 |
| Dial Gauge | Panel-1 | 0.56 | 6.73 | 4.11 | 0.76 | 6.78 | 4.34 | 0.69 | 5.00 | 2.87 | 0.53 | 4.85 | 2.49 |
| | Panel-2 | 0.58 | 6.65 | 4.09 | 0.76 | 6.60 | 3.78 | 0.69 | 5.46 | 3.15 | 0.69 | 5.28 | 2.67 |
| | Panel-3 | 0.69 | 3.53 | 1.32 | 0.66 | 3.40 | 3.25 | 0.71 | 5.56 | 3.25 | 0.66 | 5.21 | 2.62 |

(1.0 mm = 0.04 in.)

Measurements prior to truck loading were taken in order to establish a zero benchmark (reference). For each pass and stop, LVDT measurements started recording prior to the truck movement, and continued to record for a minimum of 30 seconds after the truck had made a full stop as part of the data collection process. Deflection measurements were also taken immediately after the loading sequence was completed (Day 1), herein referred to as immediate 0-hr. recovery. Measurements were also recorded after a 72-hr. recovery period (Day 2), herein referred to as a 72-hr. recovery.

The dial gauge measurements were used to further validate and confirm LVDT data, providing the vertical deflection at each point for each slab unit, pass, stop and truck loading. Also, dial gauges were used to record possible support settlements. Results from the LVDTs located at the mid-span of each slab unit under evaluation matched dial gauges. FIG. 6 shows the panel deflection under the loaded truck in passes 1 and 3. LVDTs recorded in real time the deflection of each slab unit while the truck moved from one position to the next; thus, providing additional information that can aid in the analysis of the bridge. FIG. 7 shows a representative mid-span vertical displacement (for each slab unit), versus time graph for each stop during pass 4 with the loaded truck. It should be noted that the LVDT 2 and 3 (Panel-2 and Panel-3) recorded the highest level of deflection (green and red lines overlap throughout most of the chart).

Dynamic Load Test

In order to investigate the dynamic behavior of the bridge and provide the bridge modal frequencies for long-term monitoring, a series of dynamic tests were conducted on the bridge. A laser vibrometer (model #PDV 100, Polytec GmbH, Germany) was positioned as illustrated in FIG. 3 and simply stationed near the bridge with no need for direct access to the bridge. In addition, an accelerometer was located at mid-span over the curb (not shown in FIG. 3.) The bridge vibration at mid-span was captured under moving traffic loading. FIG. 8 shows the time history and frequency spectrum of bridge acceleration obtained from the dynamic test. Based on the results, the first three bridge frequencies were obtained as 3.53 Hz, 5.39 Hz, and 8.18 Hz.

FE Modelling and Analysis

A detailed FE model was developed for the bridge superstructure in the environment of ABAQUS (Dassault 2016). In the FE analysis, steel reinforcement and strands were modeled using a multi-linear inelastic material with isotropic hardening in both tension and compression. The steel materials were specified as Grade 250 SR with the minimum tensile strengths of 1725 MPa (250 ksi) for strands and Grade 40 with the minimum yield strength of 275 MPa (40 ksi) for reinforcing bars based on the typical material properties at the time of the bridge construction. The modulus of elasticity of reinforcing bars and strands were assumed to be 200,000 MPa (29,000 ksi) and 186,000 MPa (27,000 ksi), respectively with a Poisson's ratio of 0.3. The initial pre-stress load for each strand was assumed to be 112 kN (25 kips) with a total pre-stress loss of 19 kN (4 kips) based on a lump sum estimation as per the Florida Department of Transportation (FDOT) Structures Design Standard (FDOT 2009), which is incorporated herein by reference. Concrete strength of 31.8 MPa (4.5 ksi) was assigned to the sidewalk and curb and the concrete strength of the slab units was assumed to be 36.4 MPa (5.3 ksi) as per the average strength of the core samples. For the initial concrete elastic behavior, modulus of elasticity was calculated based on the ACI 318-14 standard (ACI Committee 2014) (for normal-weight concrete) which is incorporated herein by reference and a Poisson ratio of 0.2 was used.

According to the behavior of each structural component, different element types can be selected to provide a realistic representation of the prestressed concrete bridge. For this project, eight-node linear brick elements were used for the concrete deck, whereas two-node linear 3-dimensional truss elements were used for the strands and the reinforcement embedded in the concrete slab units. The FE model of the bridge is shown in FIG. 9. Visual inspection of the asphalt overlay surface and pedestrian concrete sidewalk shows reflective longitudinal cracks and leakage along the bridge that match the locations of the slab unit edges. Moreover, non-monolithic panel deflection in the load test (e.g., as seen in FIG. 6) indicates closure joint damage that affected the bridge integrity.

Damage Detection Procedure for Deck Panel Joints

Based on the basic relationship introduced for this method, the number of damage indexes and measured responses must be the same in a determinant solution. However, if the number of response parameters is larger than the number of damage indexes, the problem is over-determinant. In this case, rather than directly solving the basic equation for the unknown damage indexes, an optimization procedure can be utilized. The problem can be restated as an optimization problem to minimize the error. If the number of unknowns (n) is larger than the number of response parameters (m), the problem is under-determinant and different load cases are required from the load testing (truck position) to derive the damages from the limited number of measurement; this case can also be restated as an optimization problem to find the best damage indexes matches for different load cases.

In order to validate the proposed joint damage detection method, results of the bridge load test were used for detecting possible damages in the joints. The bridge has eight longitudinal closure joints (unknown) connecting bridge panels. However, only the deflection of three panels was measured during load testing (measured response). Since the number of unknown is larger than the measured response, the problem is under-determinant and errors related to measurements exist in the problem; two different loading configurations were used and the problem was restated as an optimization problem to find the best damage indexes matching measured bridge responses.

The measured panels deflection at mid-span using LVDT was used as the bridge measured responses in this section. To this end, two different load cases of L-12 and L-42 corresponding to the worst-case scenario, with the center of the rear double axle at the bridge mid-span were selected. Changes in the structural response of the three measured panels (LVDT results including random measurement errors) to the intact condition obtained from the FE model were determined and utilized as "measured responses", for the two load cases as follows:

$$\Delta_{MEASURED\text{-}L\text{-}12} = \begin{bmatrix} -7.7 \\ -9.2 \\ -9.0 \end{bmatrix}, \Delta_{MEASURED\text{-}L\text{-}42} = \begin{bmatrix} -3.6 \\ -5.6 \\ -6.7 \end{bmatrix}$$

By combining these two matrices $\Delta_{MEASURED}$ can be obtained as:

$$\Delta_{MEASURED} = \begin{bmatrix} -3.6 \\ -5.6 \\ -6.7 \\ -7.7 \\ -9.2 \\ -9.0 \end{bmatrix}$$

The FE model was used to calculate the transformation matrix C for each of the load cases (L-12 and L-42) by applying full damage to each joint while keeping other joints intact. The results showed that the effect of damage in the joints 7 and 8 are negligible in the considered load cases (see FIG. 1 for joint locations). Therefore, for simplicity, the effect of these two joints was ignored. Here, as mentioned above, to obtain better accuracy for results, the number of equations o increased from 3 to 6 by combining the results for two load cases. For the combined C and $\Delta_{MEASURED}$, the first three rows of the matrix correspond to L-12 and the last three rows correspond to L-42 loading configuration. Hence, C and $\Delta D_{JOINT}$ can be obtained as:

$$C = \begin{bmatrix} -7.4 & -11.4 & -13.3 & -8.7 & -10.7 & -13.2 \\ -8.1 & -12.6 & -14.8 & -10.3 & -12.9 & -4.7 \\ -8.9 & -13.9 & -16.5 & -12.1 & 2.8 & -3.7 \\ -7.0 & -10.8 & -12.7 & -19.6 & -12.0 & -25 \\ -7.6 & -11.7 & -13.7 & -21.4 & -13.7 & 4.8 \\ -8.1 & -12.6 & -14.7 & -23.4 & 3.6 & 4.3 \end{bmatrix}$$

The basic relationship can be introduced as: $[C] [\Delta D_{JOINT}] = [\Delta_{MEASURED}]$
where $$\Delta D_{JOINT} = \begin{bmatrix} d1 \\ d2 \\ d3 \\ d4 \\ d5 \\ d6 \end{bmatrix}$$

corresponds to the damage of each joint (see FIG. 1 for joint locations)

The basic relationship can be restated as an optimization problem:

$$[C][\Delta D_{JOINT}] - [\Delta_{MEASURED}] = [M] = 0 \tag{13}$$

The target function for this problem is to minimize $\Sigma(M_i)^2$ while $0 \leq d_i \leq 1$. Solving the optimization problem results in damage indexes for each joint as follows:

$$\Delta D_{JOINT} = \begin{bmatrix} 0 \\ 0 \\ 0.15 \\ 0.31 \\ 0 \\ 0.01 \end{bmatrix}$$

FIG. 10 shows the application interface of the developed tool according to certain embodiments of the subject invention for the bridge joint damage detection in this example including bridge configuration, measured responses, joint sensitivity, bridge loading test and damage detection.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for identifying the location and severity of possible damages in structural joints of a structure by determining best fit values for a structure joint damage vector in the structure, the system comprising:
    a processor; and
    a machine-readable medium in operable communication with the processor and having instructions stored thereon that, when executed by the processor, perform the following steps:
        identifying a set of structure joints, [J(j)], numbered 1 to n;
        creating a structure joint damage vector of length n, [$\Delta D_{joint}$(j)], seeded with a starting value at each index, j, from 1 to n;
        identifying a set of structure response parameters, [p(i)], numbered 1 to m;
        creating a structure delta response vector, [$\Delta_{MEASURED}$(i)], of length m;

creating a structure sensitivity matrix, [C], of m rows and n columns, with each value of [C(i,j)] being a change in [p(i)] with respect to changes in [$\Delta D_{JOINT}$ (j)] for each index, i, from 1 to m and each index, j, from 1 to n;

either (1) solving an equation of the form [C] [$\Delta D_{JOINT}$ (j)]=[$\Delta_{MEASURED}$(i)], or (2) optimizing an equation of the form [C] [$\Delta D_{JOINT}$(j)]−[$\Delta_{MEASURED}$(i)]=[M]=0 to find values of [$\Delta D_{JOINT}$(J)] that minimize an error vector [M]; thus determining a structure joint damage vector of length n, [$\Delta D_{FIT}$], containing the actual or best fit values for the structure joint damage vector at each index, j, from 1 to n; and comparing [$\Delta D_{FIT}$] against a threshold value at each index, j, from 1 to n, thus identifying the location and severity of possible damages in structural joints of the structure.

2. The system according to claim 1, the instructions when executed by the processor further performing the following steps:

defining a joint damage cutoff value a, such that 0≤a≤1;

defining a finite element (FE) model with inputs comprising [$\Delta D_{joint}$(j)], and outputs comprising [p(i)] and [C];

identifying a set of structure reference parameters, [r(i)], numbered 1 to q, q being equal to m;

calculating a value [$r_0$(i)] for each index, i, from 1 to m, as the output [p(i)] from the FE model representing an initial or undamaged state of the structure with inputs comprising [$\Delta D_{joint}$ (j)]=0, for each index, j, from 1 to n;

calculating a [$p_j$(i)] for each index, i, from 1 to m and each index, j, from 1 to n, as the output [p(i)] from measurements taken at a second or damaged state of the structure; and calculating [C(i,j)] as [$p_j$(i)]−[$r_0$(i)] for each index, i, from 1 to m and each index, j, from 1 to n.

3. The system according to claim 1, the instructions when executed by the processor further performing the following steps:

identifying a set of structure reference parameters, [r(i)], numbered 1 to q, q being equal to m;

calculating a value [$r_0$(i)] for each index, i, from 1 to m, from measurements taken at an initial or undamaged state of the structure;

calculating a [$p_j$(i)] for each index, i, from 1 to m and each index, j, from 1 to n, from measurements taken at a second or damaged state of the structure;

calculating [C(i,j)] as [$p_j$(i)]−[$r_0$(i)] for each index, i, from 1 to m and each index, j, from 1 to n.

4. The system according to claim 1, the size, m, of the set of response parameters [p(i)] being less than the size, n, of the set of structure joints, [J(j)].

5. The system according to claim 1, the size, m, of the set of response parameters [p(i)] being greater than the size, n, of the set of structure joints, [J(j)].

6. The system according to claim 1, the size, m, of the set of response parameters [p(i)] being equal to the size, n, of the set of structure joints, [J(j)].

7. The system according to claim 1, the step of optimizing an equation of the form [C] [$\Delta D_{JOINT}$(j)]−[$\Delta_{MEASURED}$(i)]=[M]=0 comprising varying the respective values of [$\Delta D_{JOINT}$(j)] at each index, i from 1 to m, to minimize $\Sigma(M_i)^2$.

8. The system according to claim 1, the set of structure response parameters, [p(i)], being created by a sensor array comprising two or more sensors configured to record responses of the structure at two or more locations under moving traffic loading.

9. The system according to claim 1, the set of structure response parameters, [p(i)], being created by a sensor array comprising two or more sensors configured to record responses of the structure at two or more locations under static test loading.

10. The system according to claim 1, the set of structure response parameters, [p(i)], being created by combining data collected in response to 2 or more different loading conditions.

11. A method for identifying the location and severity of possible damages in structural joints of a structure by determining best fit values for a structure joint damage vector in the structure, the method comprising:

identifying, by a processor, a set of structure joints, [J(j)], numbered 1 to n;

creating, by the processor, a structure joint damage vector of length n, [$\Delta D_{joint}$(j)], seeded with a starting value at each index, j, from 1 to n;

identifying, by the processor, a set of structure response parameters, [p(i)], numbered 1 to m;

creating, by the processor, a structure delta response vector, [$\Delta_{MEASURED}$(i)], of length m;

creating, by the processor, a structure sensitivity matrix, [C], of m rows and n columns, with each value of [C(i,j)] being a change in [p(i)] with respect to changes in [$\Delta D_{JOINT}$ (j)] for each index, i, from 1 to m and each index, j, from 1 to n;

either (1) solving, by the processor, an equation of the form [C] [$\Delta D_{JOINT}$(j)]=[$\Delta_{MEASURED}$(i)], or (2) optimizing, by the processor, an equation of the form [C] [$\Delta D_{JOINT}$(j)]−[$\Delta_{MEASURED}$(i)]=[M]=0 to find values of [$\Delta D_{JOINT}$(j)] that minimize an error vector [M]; thus determining a structure joint damage vector of length n, [$\Delta D_{FIT}$], containing the actual or best fit values for the structure joint damage vector at each index, j, from 1 to n; and comparing, by the processor, [$\Delta D_{FIT}$] against a threshold value at each index, j, from 1 to n, thus identifying the location and severity of possible damages in structural joints of the structure.

12. The method according to claim 11, further comprising the following steps:

defining, by the processor, a joint damage cutoff value a, such that 0≤a≤1;

defining, by the processor, a finite element (FE) model with inputs comprising [$\Delta D_{joint}$(j)], and outputs comprising [p(i)] and [C];

identifying, by the processor, a set of structure reference parameters, [r(i)], numbered 1 to q, q being equal to m;

calculating, by the processor, a value [$r_0$(i)] for each index, i, from 1 to m, as the output [p(i)] from the FE model representing an initial or undamaged state of the structure with inputs comprising [$\Delta D_{joint}$(j)]=0, for each index, j, from 1 to n;

calculating, by the processor, a [$p_j$(i)] for each index, i, from 1 to m and each index, j, from 1 to n, as the output [p(i)] from measurements taken at a second or damaged state of the structure;

calculating, by the processor, [C(i,j)] as [$p_j$(i)]−[$r_0$(i)] for each index, i, from 1 to m and each index, j, from 1 to n.

13. The method according to claim 11, further comprising the following steps:
- identifying, by the processor, a set of structure reference parameters, [r(i)], numbered 1 to q, q being equal to m;
- calculating, by the processor, a value $[r_0(i)]$ for each index, i, from 1 to m, from measurements taken at an initial or undamaged state of the structure;
- calculating, by the processor, a $[p_j(i)]$ for each index, i, from 1 to m and each index, j, from 1 to n, from measurements taken at a second or damaged state of the structure;
- calculating, by the processor, [C(i,j)] as $[p_j(i)]-[r_0(i)]$ for each index, i, from 1 to m and each index, j, from 1 to n.

14. The method according to claim 11, the size, m, of the set of response parameters [p(i)] being greater than or less than the size, n, of the set of structure joints, [J(j)].

15. The method according to claim 11, the size, m, of the set of response parameters [p(i)] being equal to the size, n, of the set of structure joints, [J(j)].

16. The method according to claim 11, the structure joint damage vector, $[\Delta D_{JOINT}(j)]$, being seeded with a starting value between 0 and 1 at each index, j from 1 to n.

17. The method according to claim 11, the set of structure response parameters [p(i)], being created by a sensor array comprising two or more sensors configured to record responses of the structure at two or more locations under moving traffic loading.

18. The method according to claim 11, the set of structure response parameters, [p(i)], being created by a sensor array comprising two or more sensors configured to record responses of the structure at two or more locations under static test loading.

19. The method according to claim 11, the set of structure response parameters, [p(i)], being created by combining data collected in response to 2 or more different loading conditions.

20. A system for identifying the location and severity of possible damages in structural joints of a structure by determining best fit values for a structure joint damage vector in the structure, the system comprising:
- a processor; and
- a machine-readable medium in operable communication with the processor and having instructions stored thereon that, when executed by the processor, perform the following steps:
  - identifying a set of structure joints, [J(j)], numbered 1 to n;
  - creating a structure joint damage vector of length n, $[\Delta D_{joint}(j)]$, seeded with a starting value at each index, j, from 1 to n;
  - identifying a set of structure response parameters, [p(i)], numbered 1 to m;
  - creating a structure delta response vector, $[\Delta_{MEASURED}(i)]$, of length m;
  - creating a structure sensitivity matrix, [C], of m rows and n columns, with each value of [C(i,j)] being a change in [p(i)] with respect to changes in $[\Delta D_{JOINT}(j)]$ for each index, i, from 1 to m and each index, j, from 1 to n;
  - either (1) solving an equation of the form $[C][\Delta D_{JOINT}(j)]=[\Delta_{MEASURED}(i)]$, or (2) optimizing an equation of the form $[C][\Delta D_{JOINT}(j)]-[\Delta_{MEASURED}(i)]=[M]=0$ to find values of $[\Delta D_{JOINT}(j)]$ that minimize an error vector [M]; thus determining a structure joint damage vector of length n, $[\Delta D_{FIT}]$, containing the actual or best fit values for the structure joint damage vector at each index, j, from 1 to n;
  - comparing $[\Delta D_{FIT}]$ against a threshold value at each index, j, from 1 to n, thus identifying the location and severity of possible damages in structural joints of the structure;
  - defining a joint damage cutoff value a, such that $0 \le a \le 1$;
  - defining a finite element (FE) model with inputs comprising $[\Delta D_{joint}(j)]$, and outputs comprising [p(i)] and [C];
  - identifying a set of structure reference parameters, [r(i)], numbered 1 to q, q being equal to m;
  - calculating a value $[r_0(i)]$ for each index, i, from 1 to m, as the output [p(i)] from the FE model representing an initial or undamaged state of the structure with inputs comprising $[\Delta D_{joint}(j)]=0$, for each index, j, from 1 to n;
  - calculating a $[p_j(i)]$ for each index, i, from 1 to m and each index, j, from 1 to n, as the output [p(i)] from measurements taken at a second or damaged state of the structure; and
  - calculating [C(i,j)] as $[p_j(i)]-[r_0(i)]$ for each index, i, from 1 to m and each index, j, from 1 to n,
- the size, m, of the set of response parameters [p(i)] being greater than the size, n, of the set of structure joints, [J(j)],
- the structure joint damage vector, $[\Delta D_{JOINT}(j)]$, being seeded with a starting value between 0 and 1 at each index, j from 1 to n
- the step of optimizing an equation of the form $[C][\Delta D_{JOINT}(j)]-[\Delta_{MEASURED}(i)]=[M]=0$ comprising varying the respective values of $[\Delta D_{JOINT}(j)]$ at each index, i from 1 to m, to minimize $\Sigma(M_i)^2$,
- the set of structure response parameters, [p(i)], being created by a sensor array comprising two or more sensors configured to record responses of the structure at two or more locations under moving traffic loading or under static test loading in response to 2 or more different loading conditions.

* * * * *